Nov. 25, 1969  J. C. BAYLESS  3,480,317
SNAP-ON BAIL FOR BUCKETS
Filed Feb. 8, 1968
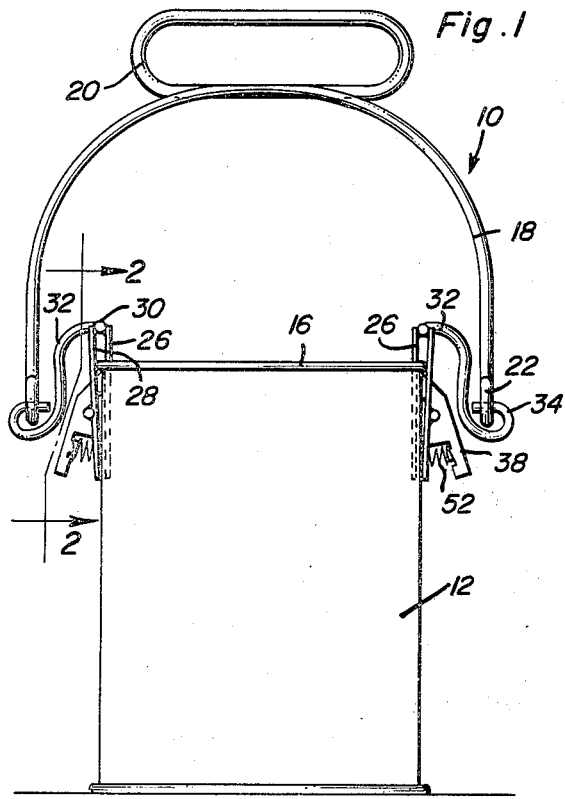
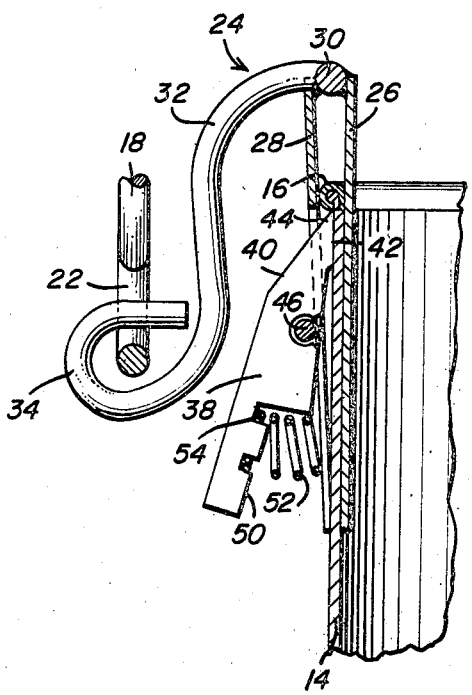
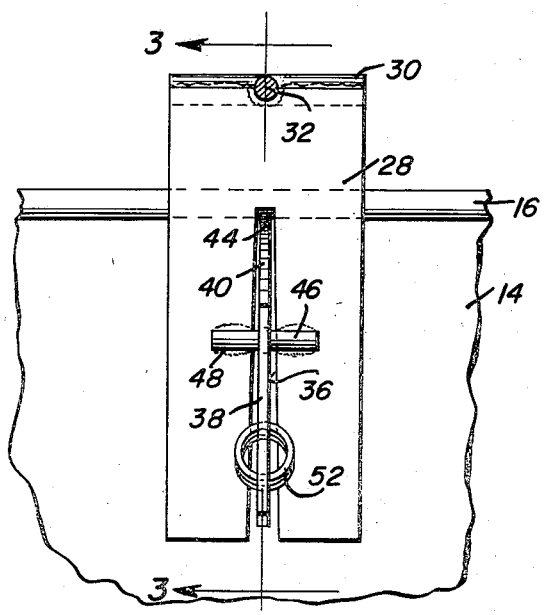
James C. Bayless
INVENTOR.

3,480,317
SNAP-ON BAIL FOR BUCKETS
James C. Bayless, P.O. Box 1133,
Canadian, Tex. 79014
Filed Feb. 8, 1968, Ser. No. 704,046
Int. Cl. A47j 45/10
U.S. Cl. 294—31       8 Claims

ABSTRACT OF THE DISCLOSURE

A handle in the form of a bail for attachment to the upper end of a container having a peripheral external rim or bead thereon. The handle includes a U-shaped or semi-circular wire bail with a loop formed in the center thereof and snap-on brackets or connectors at each end thereof for engagement with the pail or container.

---

Frequently, it is desirable to use a container subsequent to its initial use for a consumable commodity. For example, cans such as those in which coffee or the like is sold are reused by painters or the like. When such cans are reused, they are rather difficult to handle inasmuch as there is no handle provided thereon. Accordingly, it is an object of the present invention to provide a handle which is attachable to the open upper end of such a container which may be attached without the use of any tools whatsoever, and without puncturing or otherwise damaging, bending or disturbing the construction of the container.

Another object of the present invention is to provide an attachable handle in the form of a bail having a pair of connectors or brackets each of which has a downwardly opening slot-like construction telescopically engaged over the upper end of the container together with a spring-urged latch construction which will spring inwardly under the rim of the container to lock the handle thereto.

A further object of the present invention is to provide an attachable handle in accordance with the preceding object in which the latch is pivotally attached to the bracket and is provided with a pointed end spring-biased into engagement under the rim of the container.

Yet another object of the present invention is to provide an attachable handle in accordance with the preceding objects which is simple in construction, easy to attach and detach, relatively inexpensive to manufacture and dependable for connecting a handle to a container.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the container with the handle of the present invention attached thereto;

FIGURE 2 is a detailed sectional view, on an enlarged scale, taken substantially upon a plane passing along section line 2—2 of FIG. 1 illustrating the bracket and latch construction; and FIGURE 3 is a vertical sectional view taken substantially upon a plane passing along section line 3—3 of FIGURE 2 illustrating further structural details of the container and bracket for attaching the handle thereto.

Referring now specifically to the drawings, the numeral 10 generally designates the handle construction of the present invention detachably attached to a conventional container 12 in the form of a tin can or the like such as normally employed for coffee and other commodities. Such containers 12 include a peripheral wall 14 having an outwardly extending peripheral rim 16 at the upper end thereof and, of course, at the lower end. When the top of the container is removed and the contents thereof consumed, the can can then be reused by attaching the handle 10 thereto. Insofar as the container is concerned, it is completed conventional and may be any type of conventional container of the type having a peripheral rim or bead thereon.

The attachable handle 10 includes a generally U-shaped or semi-circular wire bail 18 constructed of resilient rod-like material or the like which has a horizontally elongated loop 20 formed in the center thereof to provide a convenient handgrip for the handle and to enable the handle to be hung from a suitable support such as a projection or the like on a ladder or any other suitable type of support. Each end of the bail 18 is provided with a loop or eye 22 thereon for pivotal connection with a bracket generally designated by the numeral 24.

Each bracket 24 includes a pair of spaced plates 26 and 28 which are interconnected by a rod member 30 at the upper end thereof which extends from edge to edge of the plates 26 and 28. Rigidly attached to the rod 30 and to the plates 26 and 28 is an outwardly extending and downwardly curved rod 32 which terminates in a reversely curved loop or eye 34 which is vertically disposed and which is pivotally engaged by the eye 22 on the bail 18 thus pivotally connecting the bail 18 to the bracket 24.

As illustrated in FIGURE 3, the plates 26 and 28 extend downwardly along the inner and outer surface of the peripheral wall 14 of the container 12 with the rib 16 also being received between the plates 26 and 28. Also, the plates 26 and 28 are slightly arcuately curved to conform with the curvature of the container and the outer plate 28 is provided with a longitudinal slot 36 extending upwardly from the bottom edge thereof which receives a latch plate 38 therethrough. The upper end of the latch plate is provided with an inclined outer surface 40 converging with and connected with a flat inner edge 42 to define a pointed tip end 44 which is received under the rim or bead 16 as illustrated in FIGURE 3. The latch plate 38 is attached to a pivot pin 46 extending transversely of the slot 36 and welded to the plate 28 as by welding 48 or the like. The inner edge of the lower end of the latch 38 is cutaway as at 50 to form a recess for receiving a coil spring 52 which has one end thereof received in and secured to notches 54 formed in the recessed edge 50 of the latch plate 38. The inner end of the coil spring 52 engages the outer surface of the plate 28 and is secured thereto as by welding or the like so that the parted end 44 of the latch plate 38 is biased inwardly into underlying engagement with the rim or bead 16 to lock the bracket 24 in position thereon. When it is desired to release the bracket, it is only necessary to force the lower end of the latch plate 38 inwardly thus moving the pointed end 44 outwardly of the bead or rim 16 so that the bracket 24 may be slid upwardly off of the container.

To assemble the handle, the brackets 24 are telescoped over the upper end of the container and the flat inner surface 42 will be slightly inclined when the point 44 engages the inner surface of the plate 26 and thus will be cammed outwardly to enable the latch plate 38 to snap back to latching position with the pointed end 44 thereof underlying the rim or bead 16. The plates 26 and 28 may be substantially parallel to each other or slightly converging but the free end thereof should be sufficiently spaced apart to enable easy telescoping engagement over the upper end of the container. Of course, the bracket should be at diametrically opposed points of the container or approximately at such diametrically opposed points. Once the brackets have been attached to the container, they are securely held in position by the latch plates 38 thus enabling the container to be employed for various purposes such as a paint container or the like with the loop handle 20 enabling easy carrying and manipulation thereof.

The particular shape of the hinge construction for the bail may be varied in that it may extend downwardly or the bail may be attached directly to one of the plates 26 and 28 or suitable projection provided on the plate 28 to form a hinge connection with the bail-type handle.

The components may be constructed of various materials such as metal, plastic or the like having sufficient strength requirement and yet being sufficiently inexpensive to be economically feasible. Inasmuch as the bail does not mar or damage the bead 16, the bail may be removed and the normally provided plastic cap or cover for this type of can can be reapplied to the container to retain the contents of the container free of air which is highly desirable when painting.

The foregoing is considered as illustrative only of the principles of the invention. Further, since numerous modifications and changes will readily occur to those skilled in the art, it is not desired to limit the invention to the exact construction and operation shown an described, and accordingly all suitable modifications and equivalents may be resorted to, falling within the scope of the invention as claimed.

What is claimed as new is as follows:

1. An attachable handle for a container having a peripheral external bead at the upper end thereof comprising a generally U-shaped bail, and bracket means at each end of said bail for detachable connection with the upper end of the container, each of said bracket means including a downwardly opening channel-shaped member adapted to telescope over the upper end of the container, and spring biased latch means on said bracket means engageable under the bead on the container.

2. The structure as defined in claim 1 wherein said channel-shaped member includes a pair of substantially parallel plates, the outer of said plates being slotted, said latch means including a latch plate pivotally mounted on the outermost plate and including an upwardly facing pointed end movable in relation to the slot for engagement under the bead on the container.

3. The structure as defined in claim 2 wherein a coil spring is disposed between the outermost plate and the latch plate on the side of the pivotal support therefor opposite to the pointed end.

4. The structure as defined in claim 3 wherein the upper ends of said plates are fixedly interconnected, hinge means interconnecting said plates and the ends of said bail for pivotally connecting the bail thereto.

5. The structure as defined in claim 4 wherein said bail includes a horizontally elongated loop shaped handle formed centrally therein for enabling support thereof.

6. The combination of a can having an external bead at the open upper end thereof, and a handle attachable thereto, said handle including a generally U-shaped bail, bracket means at each end of said bail for detachable engagement with the upper end of the can, said bracket means including a pair of spaced plates telescopically straddling the wall and bead of the can, a manually releasable and spring-biased operable latch means mounted on the outer plate for engagement under said bead when the plates are disposed in telescopic straddling engagement with the wall and bead on the can.

7. The combination as defined in claim 6 wherein said latch means includes a latch plate disposed substantially in a plane perpendicular to the plane of the container wall, said plate having an upwardly facing pointed end engageable under the bead to lock the plates to the can.

8. The combination as defined in claim 7 wherein said bail and plates include hinge means interconnecting the bail and plates for enabling pivotal movement of the bail, the central portion of said bail having an elongated loop shaped handle formed integrally therein.

References Cited

UNITED STATES PATENTS 3,352,591    11/1967    Casey _____ 294—31

EVON C. BLUNK, Primary Examiner

ROGER C. GAITHER, Assistant Examiner